United States Patent
Walsh

(10) Patent No.: US 10,125,814 B2
(45) Date of Patent: Nov. 13, 2018

(54) PASSIVE MAGNETIC BEARING

(71) Applicant: Raymond James Walsh, Dallas, TX (US)

(72) Inventor: Raymond James Walsh, Dallas, TX (US)

( * ) Notice: Subject to any disclaimer, the term of this patent is extended or adjusted under 35 U.S.C. 154(b) by 752 days.

(21) Appl. No.: 14/523,687

(22) Filed: Oct. 24, 2014

(65) Prior Publication Data

US 2015/0115756 A1 Apr. 30, 2015

Related U.S. Application Data

(60) Provisional application No. 61/895,115, filed on Oct. 24, 2013.

(51) Int. Cl.
 *F16C 32/04* (2006.01)

(52) U.S. Cl.
 CPC ...... *F16C 32/0408* (2013.01); *F16C 32/0417* (2013.01); *F16C 2361/55* (2013.01)

(58) Field of Classification Search
 CPC . H02K 7/09; F16C 17/08; F16C 25/04; F16C 25/045; F16C 32/04; F16C 32/0408; F16C 32/0412; F16C 32/041; F16C 32/042; F16C 32/0425; F16C 32/043; F16C 32/0436; F16C 32/044; F16C 32/0448
 USPC ........................................................ 310/90.5
 See application file for complete search history.

(56) References Cited

U.S. PATENT DOCUMENTS

| | | | | |
|---|---|---|---|---|
| 3,614,181 A | * | 10/1971 | Meeks ................ | F16C 32/0417 310/90.5 |
| 3,958,842 A | * | 5/1976 | Telle ................... | F16C 32/0425 310/90.5 |
| 4,629,261 A | * | 12/1986 | Eiermann ........... | F16C 32/0442 251/30.01 |
| 5,072,146 A | * | 12/1991 | New ................... | F16C 32/0442 310/214 |
| 5,107,238 A | * | 4/1992 | Leupold ............. | H01J 23/0873 315/5.35 |
| 5,126,610 A | * | 6/1992 | Fremerey ................ | D01H 4/12 310/51 |
| 5,152,679 A | * | 10/1992 | Kanemitsu ........... | F04D 19/048 417/423.4 |
| 5,250,865 A | * | 10/1993 | Meeks ................ | F16C 32/0465 310/90.5 |

(Continued)

*Primary Examiner* — Tran Nguyen
(74) *Attorney, Agent, or Firm* — Robert L. Shaver; Scott D. Swanson; Shaver & Swanson, LLP

(57) ABSTRACT

A magnetic bearing retains a rotatable shaft in a selected position by magnetic coupling between a circular magnet and one or more magnet arrays. Each magnetic coupling completes a magnetic circuit. The magnet arrays focus magnetic flux towards the circular magnet to facilitate magnetic coupling. Magnet arrays configured in Halbach series may be employed. Magnet arrays configured as electromagnets may also be employed. The shaft may be attached either to the circular magnet or the magnet arrays. Shaft rotation does not affect the magnetic circuit, but axial displacement of the shaft disrupts the magnetic circuit and increases magnetic reluctance. Increasing magnetic reluctance inhibits axial displacement. The shaft thereby supports a load while rotating freely, constrained to a selected position by forces of magnetic reluctance. A centering bearing may be employed to maintain gap distance between circular magnet and one or more magnet arrays.

20 Claims, 6 Drawing Sheets

(56) References Cited

U.S. PATENT DOCUMENTS

| | | | | |
|---|---|---|---|---|
| 5,482,919 A * | 1/1996 | Joshi | ................... | F25B 9/14 |
| | | | | 310/52 |
| 5,506,459 A * | 4/1996 | Ritts | ................... | A63H 1/00 |
| | | | | 310/90.5 |
| 5,521,448 A * | 5/1996 | Tecza | ................... | F16C 27/06 |
| | | | | 310/51 |
| 5,545,937 A | 8/1996 | Dunfield et al. | | |
| 5,722,326 A | 3/1998 | Post | | |
| 6,111,332 A * | 8/2000 | Post | ................... | F16C 32/0412 |
| | | | | 310/156.43 |
| 6,657,344 B2 | 12/2003 | Post | | |
| 6,664,880 B2 | 12/2003 | Post | | |
| 6,758,146 B2 | 7/2004 | Post | | |
| 7,276,828 B2 * | 10/2007 | Yeh | ................... | F04D 29/058 |
| | | | | 310/67 R |
| 8,823,233 B2 | 9/2014 | Post | | |
| 2003/0042816 A1 | 3/2003 | Post | | |
| 2003/0155830 A1 * | 8/2003 | Beyer | ................... | F04D 19/048 |
| | | | | 310/90.5 |
| 2008/0143205 A1 * | 6/2008 | Pulnikov | ................... | F16C 17/02 |
| | | | | 310/90.5 |
| 2010/0194225 A1 * | 8/2010 | Allaire | ................... | F04D 19/042 |
| | | | | 310/90.5 |
| 2012/0262095 A1 * | 10/2012 | Smith | ................... | H02K 7/09 |
| | | | | 318/135 |

\* cited by examiner

PASSIVE MAGNETIC BEARING

PRIORITY/CROSS-REFERENCE TO RELATED APPLICATIONS

This application claims the benefit of U.S. Provisional Application No. 61/895,115, filed Oct. 24, 2013, the disclosure of which is incorporated by reference.

TECHNICAL FIELD

The disclosed technology generally relates to bearings, and more particularly to magnetic bearings.

BACKGROUND

A bearing is a machine element that both reduces friction and constrains motion between moving parts. Many types of bearings exist, but the greatest reduction in friction occurs when a magnetic bearing is employed, which supports a load using magnetic levitation. Magnetic bearings permit relative motion with very low friction and mechanical wear, and thus support the highest speeds of all kinds of bearing.

Some magnetic bearings use permanent magnets and do not require input of power, but do require external stabilization due to the limitations described by Earnshaw's Theorem. Most magnetic bearings use attraction or repulsion to achieve levitation. Review of the prior art, however, indicates that magnetic bearings exploiting magnetic reluctance have not previously been described.

One way to asymmetrically focus magnetic flux employs a horseshoe-shaped electromagnetic coil. Another means to asymmetrically focus magnetic flux employs magnetic bearing designs use variations of the Halbach series. The five magnet linear Halbach array is well known to those skilled in the art as a means to asymmetrically focus magnetic flux. A magnet array with as few as three consecutive magnets, however, can also focus magnetic flux asymmetrically so that north and south poles extend parallel to each other from the same side of the array. These three magnets are configured in linear fashion such that the center magnet is rotated 90 degrees relative to the end magnets, and the end magnets are rotated 180 degrees relative to each other. This type of magnet array will be called a reluctance array. Like the Halbach array, the north and south magnetic poles emanate from one side of the reluctance array.

Magnetic reluctance is defined as the resistance to the flow of magnetic flux through a magnetic circuit as determined by the magnetic permeability and arrangement of the materials of the circuit. Magnetic permeability can be thought of as the ability of a material to allow passage of magnetic flux. It is analogous to the concept of conductivity in electricity. Iron, for instance, has a high magnetic permeability whereas air has low magnetic permeability. Magnetic flux will pass through air, just as an electric spark will cross an air gap, but flux passes much more readily through iron.

The components comprising a magnetic circuit tend to act in such a way as to facilitate the flow of magnetic flux through the circuit, and thus minimize reluctance. This principle is most famously illustrated in Tesla's Switched Reluctance Motor. A ferromagnetic rotor is made to rotate between electromagnets of opposite polarity (stator coils). The rotor is compelled to rotate in order to complete a magnetic circuit through the rotor and stator coils. At the point in the rotation where magnetic flux flows most readily, the magnetic circuit is said to be in a state of minimal reluctance. A series of stator coils are configured in a circle, directing magnetic flux inward towards the ferromagnetic rotor. Successively switching the polarity of the stator coils just ahead of the rotating rotor enables continued rotation. Although the Switched Reluctance Motor employs electromagnets, the reluctance principle also applies to magnetic circuits comprising permanent magnets.

Magnetic reluctance has different and advantageous physical and mathematical properties in comparison to the typical magnetic forces of magnetic attraction and repulsion. Whereas the force between magnets falls off with the inverse of the square of the distance between the magnets, reluctance forces increase in a linear fashion with displacement. For example, when two Halbach arrays are magnetically coupled across an air gap of distance X, the force between the arrays is only ¼ as strong at a gap distance of 2X. Experimentation has shown that when two arrays are made to slide past each other at a constant gap distance X, like railway cars on parallel tracks moving in opposite directions, reluctance forces will increase in linear fashion over a short displacement, achieve a maximum, then fall to zero in linear fashion. By way of reference, both a rubber band and a steel spring demonstrate linear force-displacement characteristics. Pulling on either is initially easy but becomes harder the more the rubber band or spring is stretched up to the point of failure.

Reluctance is said to be at a minimum when a magnetic circuit employs materials with the greatest permeability and when the path of the magnetic flux completes the magnetic circuit by the most direct route possible. Reducing air gaps between the magnets and/or ferromagnetic components minimizes reluctance; conversely, reluctance increases whenever a magnetic circuit is disrupted by an increased air gap between the magnetic materials comprising the circuit. Air, having relatively low magnetic permeability, resists the flow of magnetic flux. Directing or focusing the path of flux between the magnetic elements by use of magnet arrays such as the Halbach array facilitates completion of a magnetic circuit and minimizes reluctance.

SUMMARY OF THE DISCLOSURE

The purpose of the Abstract is to enable the public, and especially scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

A reluctance magnetic bearing employs magnetic reluctance to achieve magnetic levitation. Once a magnetic circuit has formed between magnets and/or circular magnet s within the bearing, there is a propensity to maintain the magnetic circuit. An outside force that disrupts this magnetic circuit increases reluctance and produces an equal and opposite force within the bearing assembly in an attempt to return to a state of minimal reluctance. A load may be substantially supported without physical contact between bearing surfaces, thus minimizing friction.

The present embodiment relates to a magnetic bearing in which moving parts are held in place and allowed to rotate by employment of magnetic coupling between a ring or disc or circular magnet or magnet (hereafter referred to simply as a circular magnet) and one or more arrays of individual magnets or electromagnets configured to direct flux towards the circular magnet. This magnetic coupling allows for rotation of the circular magnet but otherwise constrains movement of the circular magnet.

A typical bar magnet has north and south poles extending from either end, 180 degrees apart, along the physical axis of the bar magnet. The magnet arrays in one preferred embodiment comprise a group of at least three magnets stacked in linear fashion and configured to focus both the north and south magnetic poles from one side of the array. The magnetic poles extend in the same direction and parallel to each other from one side of the array. Another example of a magnet array is a linear Halbach array of at least five magnets. When Halbach arrays are noted in the disclosure, it is to be understood that Halbach arrays are a specific type of magnet array.

Note that in the arrays mentioned above, both north and south poles extend parallel to one another from one side of the array. Another example of an effective array would be the reluctance array. A third example would be a horseshoe-shaped coil or electromagnet. In each example, the intention is that both north and south poles extend substantially from the same side of the array in the direction of a circular magnet. The various means will be hereafter referred to simply as a magnet arrays.

The north and south magnetic poles of each magnet array act as a magnetic pincher extending towards the circular magnet. Several of these magnet arrays may be coupled symmetrically around the outside of a circular magnet with their magnetic poles facing the circular magnet. As a result, the circular magnet is held in place with respect to axial displacement but is still able to rotate on its generally elongate shaft, also called a rotatable shaft, or just shaft.

The magnet array may be attached to a rotatable shaft or cylinder while the circular magnet is fixed, or the circular magnet may be attached to a rotatable shaft or cylinder while the magnet arrays are fixed. Either way, the goal is axial rotation of the ring relative to the magnet arrays. The rotating shaft is generally an elongate shaft that has a linear axis and is configured for rotation around the linear axis, but may also take the form of a cylinder. The linear axis is called the rotational axis. Whether shaft or cylinder, both forms will be referred to as a shaft in this description. The shaft can be a solid rod, or a hollow tube.

Each individual magnet array completes a magnetic circuit by coupling with the circular magnet. The south magnetic pole of the circular magnet is coupled to the north magnetic pole of each magnet array. And the north magnetic pole of the circular magnet is coupled to the south magnetic pole of each magnet array. A zone below a circular magnet is a first zone of increased magnetic flux. A zone above the same circular magnet is a second zone of increased magnetic flux. A state of minimal reluctance exists when the circular magnet resides midway between the north and south poles of each magnet array, such that magnetic coupling occurs between the circular magnet and the magnet arrays. The circular element is restricted between two adjacent zones of magnetic flux created by magnet arrays. The position between zones of increased magnetic flux is a position of least magnetic flux, and therefore least magnetic reluctance, which is a predetermined position to which the shaft is to be directed. An axial load placed on the shaft will displace the circular magnet away from this center position, disrupting the magnetic circuits between the magnet arrays and the circular magnet. Disruption of these magnetic circuits increases reluctance, causing an equal and opposite axial force to be produced by the magnetic bearing. In this way, the axial load is magnetically levitated, and the shaft is restricted in its ability to move in an axial direction.

Alternatively, the magnet arrays may be attached to a shaft located inside a circular magnet with the north/south poles of the magnet arrays extending outwardly towards the ring. Just as above, this embodiment allows for rotation of the shaft but constrains axial displacement of the shaft.

In addition to enabling magnetic reluctance, magnetic coupling between circular magnet and magnet arrays generates an undesirable attractive force that seeks to pull the circular magnet off center and close the gap between circular magnet and magnetic array. Distributing the magnet arrays around the circular magnet would be helpful. But even the most perfect symmetry cannot avoid the limitations implied by Earnshaw's Theorem. Some additional means of centering the circular magnet may be desirable. One such means is a small roller bearing (annular) attached to the shaft, for example, a plain bearing, a fluid bearing, or a magnetic bearing. If a second magnetic bearing, if properly configured, would suffice. The centering bearing serves to maintain the shaft in a central position relative to the magnet arrays but avoids substantially constraining axial displacement. This provision allows for limited axial displacement during the loading of the bearing while maintaining an appropriate gap.

The magnetic reluctance bearing force-displacement curve is initially quite linear up to the capacity of the bearing. This allows the bearing to accommodate a variable load, fluctuating load, or even a vibrating load. This is analogous to the action of an automobile shock absorber as the vehicle travels uneven terrain. Because the force-displacement curve is linear and reproducible, the device can also be graduated and calibrated to function as a weight scale, analogous to a spring scale.

The load-bearing capacity can be increased by an embodiment comprising stacked circular magnets, with appropriate spacing, so as to couple with magnet arrays configured in Halbach series. This embodiment comprises two or more circular magnets, attached in parallel and coaxially, and alternating magnetic polarity. The magnet arrays are configured as Halbach series, well known to those familiar with the art. Whereas the Halbach array may have a single north pole and a single south pole, the Halbach series comprises additional magnets configured to produce a series of alternating north and south magnetic poles all extending from the same side of each series towards the coaxial circular magnets. The alternating magnetic poles are sufficient in number to magnetically couple with the stacked circular magnets. The number of circular magnet/magnet array couplings may be configured to match the bearing load.

An alternate form of the centering bearing employs a plain bearing. An embodiment is designed in which the circular magnet is attached to the inside of a first cylinder or tube. The magnet arrays are attached on the outside of a second tube of larger diameter such that the first tube fits loosely within the second tube. The inner tube may then rotate within the outer tube. The inner tube functions as a mechanical journal or sleeve rotating in contact with the inner surface of the outer tube which functions as a housing.

An embodiment having a magnet array comprising two magnets and a piece of iron is also possible, and within the breadth of the claims. It is similar to the reluctance array except that the center magnet has been replaced by a piece of iron or other ferromagnetic material. This magnet serves to conduct magnetic flux between the two magnets so as to facilitate completion of a magnetic circuit within a magnetic bearing embodiment. The magnets in this and other embodiments may be permanent magnets or electromagnets.

BRIEF DESCRIPTION OF PREFERRED EMBODIMENTS

DETAILED DESCRIPTION OF A PREFERRED EMBODIMENTS

Figure 1:
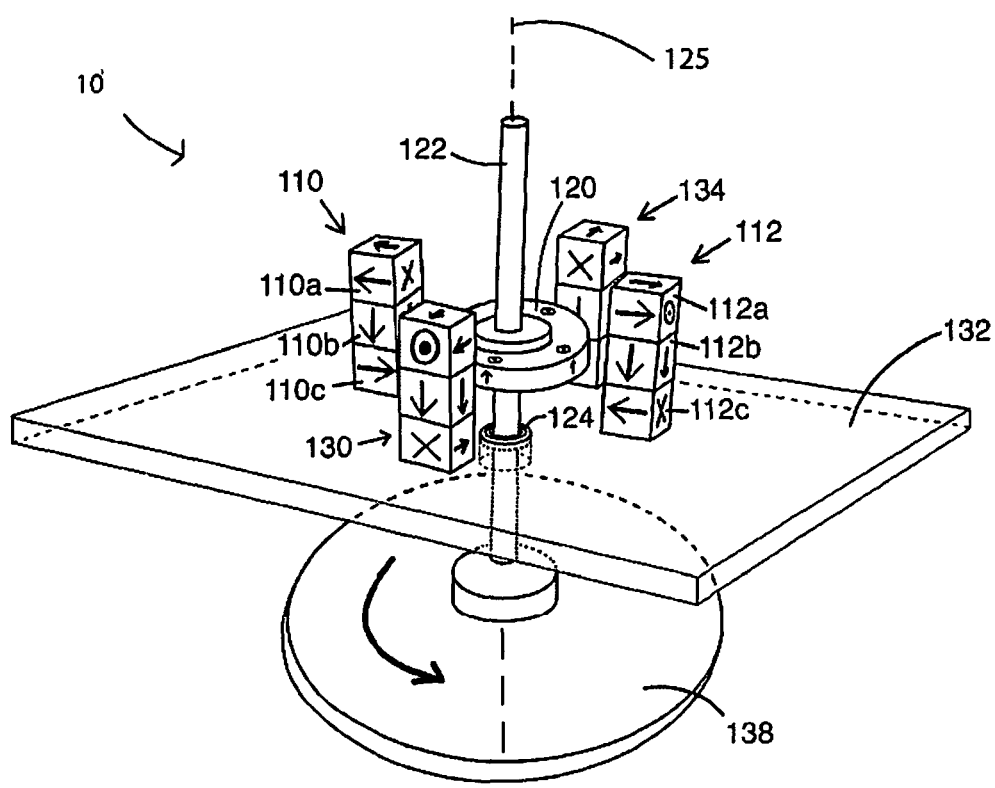
FIG. 1 is a perspective view of one embodiment a magnetic bearing with the circular magnet attached to a rotatable shaft suspended by a group of magnet arrays on the outside of the circular magnet.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

In order that the invention may be more fully understood, it will now be described by way of example, with reference to the accompanying drawings. Magnetic field line arrows may be depicted as flowing from the north pole to the south pole. As per convention well known to those familiar with the art, a small circle with a central dot indicates a magnetic north, while an "x" designates magnetic south. The accompanying drawings illustrate variations within three of the multiple elements comprising the magnetic reluctance device: The circular magnet, the magnet arrays, and the centering bearing. Numerous combinations of variations of each element may be employed to create a magnetic circuit that resists perturbation and thereby supports an axial load in accordance with the principles of magnetic reluctance. A few of the variations are illustrated within the accompanying drawings.

In a preferred embodiment shown in FIG. 1, magnet arrays 110, 112, 130, and 134 are disposed around circular magnet 120 which is operatively connected, also called attached, to rotating shaft 122 having a rotational axis 125. The circular element or magnet 120 can be made of iron, steel, and can be magnetized or non-magnetized, but is always made of a ferromagnetic material. It can be disk shaped, or ring shaped. It can also be attached to the shaft 122, with the magnet arrays (at least two) surrounding it, or it can surround magnet arrays (at least two) attached to the rotating shaft, with magnetic flux extending from the magnet arrays radially from the shaft, trapping the circular magnet. The magnetic arrays 110, 112, 130, and 134 are arranged symmetrically and equidistant from rotating shaft 122, and interact with the circular element 120. In this embodiment, the magnet arrays 110, 112, 130, and 134 comprise 3 contiguous magnets parallel with shaft 122 configured as magnet arrays. Examples of 3 contiguous magnets include 110a, 110b and 110c as well as 112a, 112b and 112c. The orientation magnetic field lines are indicated by the arrows on the magnets in the figures, with the arrowhead representing the north pole, and the non-arrowhead end of the arrow indicating the south pole. The magnet arrays 110, 112, 130, and 134 project magnetic flux towards magnet 120, effectively constraining axial displacement of shaft 122. In this embodiment magnet 120 is a circular magnet, magnetized axially with the north magnetic pole above the magnet and the south below. The magnet arrays are fixed to mounting plate 132, or they could be mounted in the interior of a tube which surrounds shaft 122. Magnet array 110 comprises magnets 110a, 110b, and 110c, while magnet array 112 comprises magnets 112a, 112b, and 112c. The configuration of these magnets directs magnetic flux towards circular magnet 120. The mass of flywheel 138 produces a downward force on shaft 122, but downward displacement of the shaft is inhibited or constrained by the magnetic interaction between circular magnet 120 and magnet arrays 110, 112, 130, and 134. One or more small roller (annular) bearings 124 allows for the sliding of shaft 122 up or down (parallel to L) but prevents circular magnet 120 from making physical contact with the magnet arrays.

Directing or focusing the path of flux between the magnetic elements by use of magnet arrays such as the Halbach series or magnet array facilitates completion of a magnetic circuit and minimizes reluctance. The magnet arrays in this embodiment focus magnetic flux asymmetrically so that north and south poles extend parallel to each other from the same side of the array. Magnet array 110 comprises three contiguous magnets 110a, 110b, and 110c, such that the center magnet 110b is rotated 90 degrees relative to the end magnets 110a and 110c, and these end magnets 110a and 110c are rotated 180 degrees relative to each other. This magnet array focuses magnetic flux so as to more directly complete a magnetic circuit with circular magnet 120.

Like the Halbach series, the north and south magnetic poles emanate from one side of the magnet array. Each magnet array in this embodiment is configured similarly to direct magnetic flux towards circular magnet 120. The south magnetic pole of magnet array 110 extends from magnet 110a towards the upper surface of 120, coupling to its north magnetic pole. The north magnetic pole of magnet array 110 extends from magnet 110c towards the lower surface of circular magnet 120, coupling to its south magnetic pole. In this way a complete magnetic circuit is formed, and forces of magnetic reluctance seek to maintain this circuit.

Figure 5:
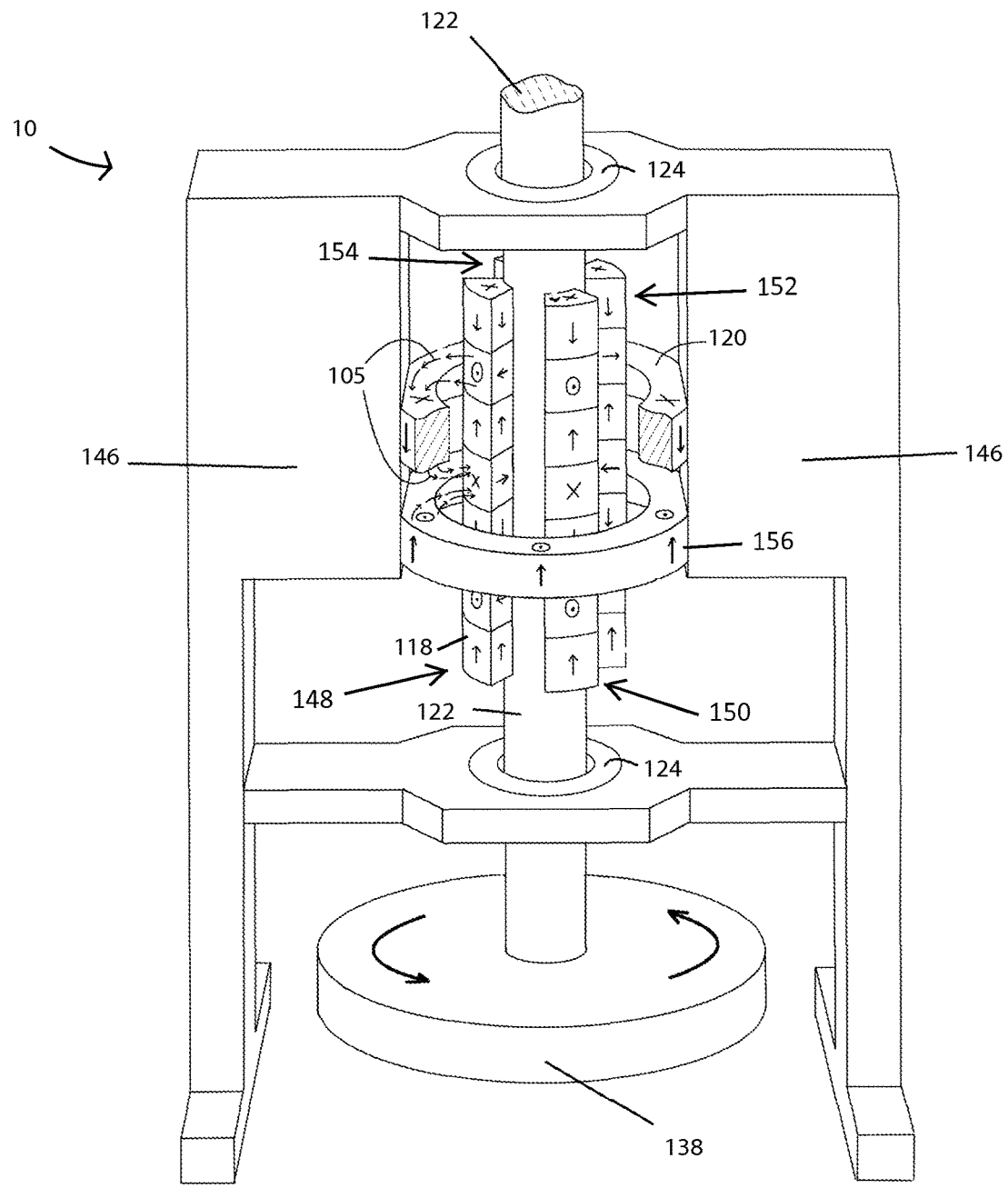
FIG. 5 is a perspective view of one embodiment of a magnetic bearing with a group of Halbach series magnet arrays attached to a rotatable shaft inside two circular magnets.

One might conceive of having other embodiments have a plurality of magnet arrays, with each having at least one magnet, positioned to magnetically couple to magnet 120 so as to complete a magnetic circuit. The circular magnet 120 can be disk shaped, or ring shaped. In one embodiment the circular magnet is disposed circumferentially outside the cylinder of Halbach series such that the north magnetic pole of the circular magnet couples with each individual Halbach series north pole. The circular magnet sits on a plane that essentially bisects the north and south poles of the Halbach series, as shown in FIGS. 1 and 5, one pole above the ring and the other below. As the cylinder or shaft 12 rotates, each individual Halbach series orbits about the axis of symmetry equidistant from the ring magnet, so the force of attraction between the ring and the Halbach series is constant. Coupling to a circular magnet produces a homogenous magnetic flux during rotation, producing no variations in force or flux between ring and magnet array and therefore no resistance to rotation.

Figure 2:
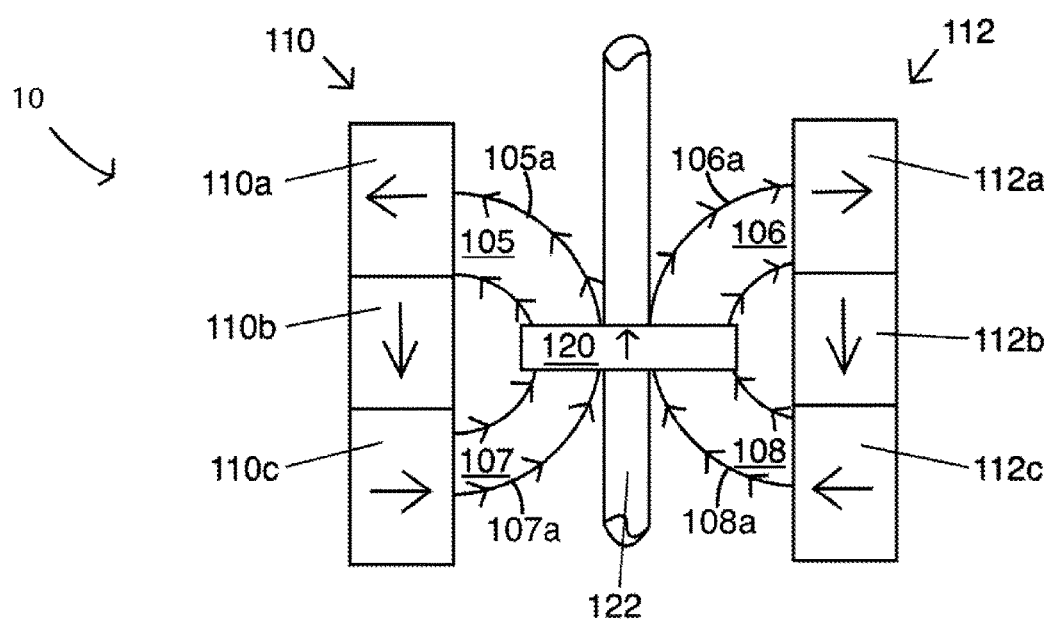
FIG. 2 is a side view schematic of a circular magnet held in position by magnetic coupling with two magnet arrays in a state of minimal reluctance.
Figure 3:
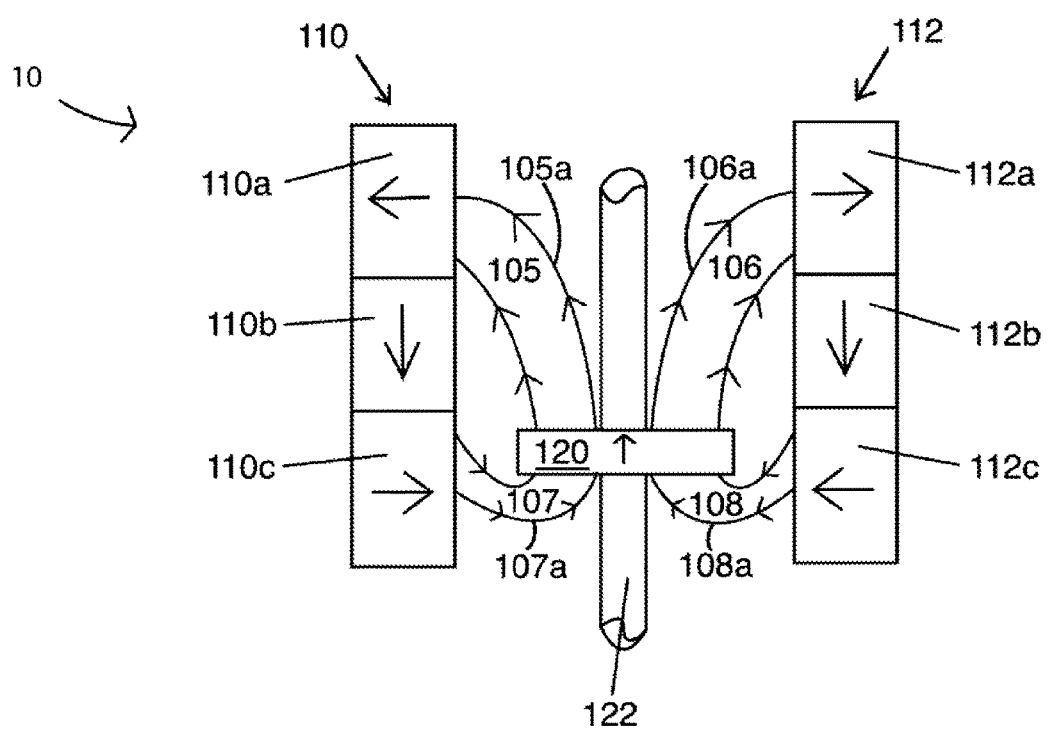
FIG. 3 is a side view schematic of the same circular magnet but in a position of increased reluctance.

FIGS. 2 and 3 are both side view schematics that illustrate the distortion of magnetic circuits within the embodiment with axial displacement of circular magnet 120.

The role of the magnet arrays 110, 112, 130 and 134 in the present invention is to bend and focus magnetic field lines 102 towards the circular magnet 120 so as to complete magnetic circuits by the most direct and magnetically permeable route. This implies a minimum of air gaps between magnetic elements within the circuit. Once formed, the complete magnetic circuit allows forces of magnetic reluctance to come into play.

In FIG. 2, circular magnet 120 is suspended between magnet arrays 110 and 112 in a predetermined position of least magnetic reluctance. Consider first magnet array 110. Note the magnetic field lines 102 emanating predominantly from the right side of the 3-magnet array, the side facing circular magnet 120. The south magnetic field pole 105 of magnet array 112 emanates from magnet 110a and is magnetically coupled to the south magnetic pole of circular magnet 120 as illustrated by magnetic field lines 105a. The north magnetic pole 107 of magnet array 110 is associated with magnet 110c and is magnetically coupled to the south magnetic pole of circular magnet 120 as illustrated by magnetic field lines 107a. This configuration completes a magnetic circuit flowing in a counterclockwise direction from magnet 110a through magnet 110b into magnet 110c, out north magnetic pole 107 along magnetic field lines 107a into circular magnet 120 continuing through magnetic field lines 105a into the south magnetic pole 105 of magnet array 110. An analogous clockwise magnetic circuit is shown in Halbach series 112 (a Halbach series is a type of magnet array) flowing through magnet 112c, out north magnetic pole 108, through magnetic field lines 108a, into disc magnet 120, out along magnetic field lines 106a, into the south magnetic pole 106 into magnet 112a and completing the circuit in 112b. Circular magnet 120 may freely rotate on shaft 122 and not effect on the position of magnetic field lines nor magnetic circuits. Rotation of circular magnet 120 therefore does not affect reluctance. The magnetic field lines 102 form a first zone 98 and a second zone 100 of increased magnetic flux, with the first zone comprising a north magnetic pole and the second zone comprising a south magnetic pole, with subsequent zones alternating in magnetic polarity.

The "pincher" effect is illustrated in FIG. 2. The south magnetic poles 105 and 106 and south magnetic poles extend towards the top of circular magnet 120 while the north magnetic poles 107 and 108 extend towards the bottom of circular magnet 120 magnetically pinching circular magnet 120. The pincher effect thus inhibits displace up or down along rotational axis 125 while allowing for axial rotation of shaft 122 attached to circular magnet 120.

FIG. 3 shows shaft 122 attached to disc magnet 120 in a position of increased magnetic reluctance. Shaft 122 has been displaced downward by a force, perhaps resulting from a mechanical load such as a flywheel (not shown). This displacement distorts magnetic field lines 102; specifically this downward displacement stretches and lengthens field lines 105a and 106b introducing a greater distance that magnetic flux must travel through air. Since air is not highly magnetically permeable, magnetic reluctance is increased.

Magnetic arrays 110 and 112 therefore exert an equal and opposite upward force on circular magnet 120. The rotation of circular magnet 120, however, is unaffected by the load and downward displacement of shaft 122. Rotation of circular magnet 120 about rotational axis 125 does not disrupt magnetic field lines and therefore has no effect on magnetic reluctance.

Figure 4:
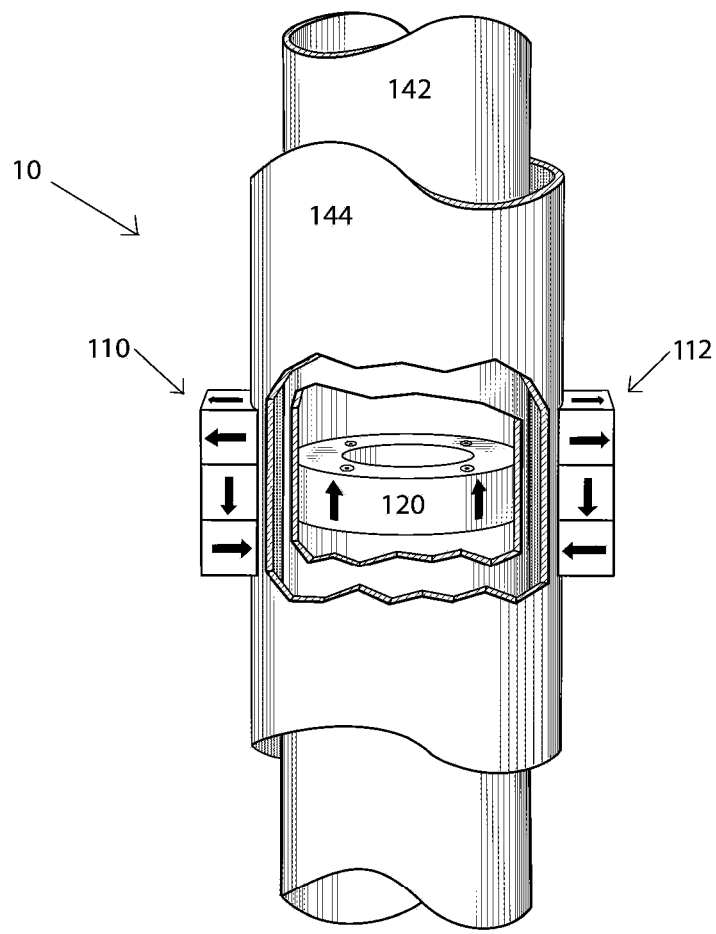
FIG. 4 is perspective view and cut away of an embodiment employing a plain bearing for centering the circular magnet within the magnet arrays.

FIG. 4 is a cutaway perspective view of one embodiment of a magnetic bearing. Circular magnet 120 is attached to an inner tube 142 with rotates within an outer tube 144. Magnet arrays 110, 112, 130 and 134 are attached to the surface of the outer tube 144. As described for the embodiment shown in FIG. 1, the magnetic field lines formed between magnets of the magnet arrays 110, 112, 130 and 134 trap circular magnet 120 in a predetermined position between magnets (and between a first 98 and a second 100 zone of increased magnetic flux) and in a position with least magnetic reluctance.

FIG. 5 is a version of the disclosed technology in which the circular magnet 120 and a second circular magnet 156 are stationary and encircle a plurality of magnet arrays configured in a Halbach series, each comprised of 7 individual magnets 118 with magnetic north indicated by the direction of the arrow within each of the 7 magnets. The magnet arrays configured in a Halbach series 148, 150, 152, and 154 are attached to a shaft or tube 122. Shaft 122 is held in a frame 146, and is centered laterally by bearings 124. Flywheel 138 is attached to shaft 122.

Additionally, since a downward force exerted on the shaft results in displacement, the device can also serve as a type of scale for weighing. In fact, the force/displacement curve is linear over most of the displacement, though it does depend on the specific arrangement of magnets.

The friction produced by the rotating flywheel is tunable. Experimentation has shown that if a 5 pound weight is set in motion at 300 rpm's, it takes about six minutes to stop rotating in one embodiment. If the weight of the flywheel is doubled to 10 pounds then set in motion at 300 RPMs, the shaft rotates for about 12 minutes. Friction between the shaft and the centering bearing decreases as the magnetic bearing approaches its load capacity. The source of friction is the centering bearing 124 holding the shaft in place.

Figure 6:
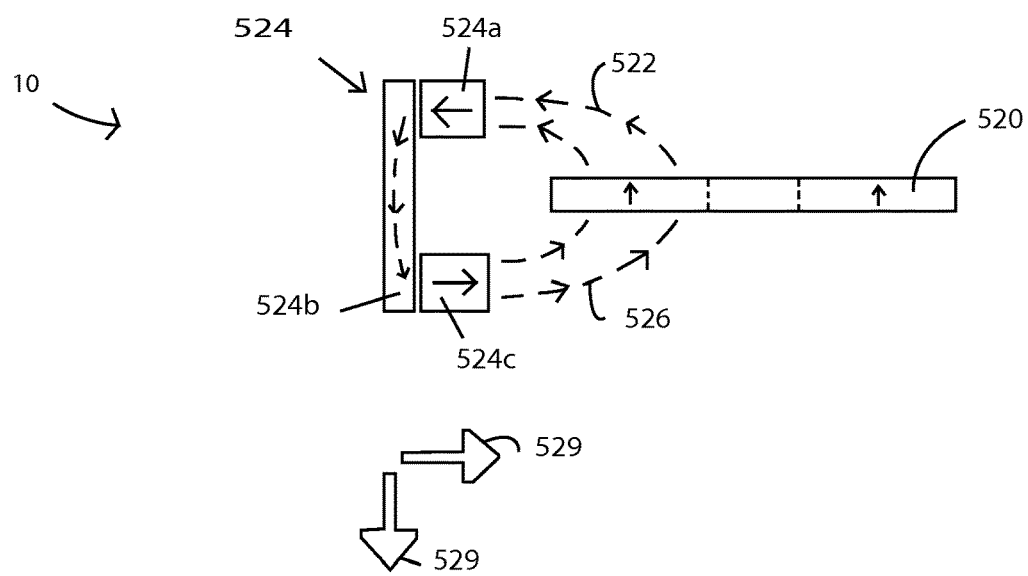
FIG. 6 is a schematic representation of a magnetic circuit showing a magnet array with 2 magnets.

A magnet array may take other forms employing various ways of directing and focusing magnetic flux. FIG. 6 illustrates magnet array 524, comprising magnets 524a and 524c, and a magnetically permeable element 524b that allows passage of magnetic flux between the magnets. Magnetically permeable element 524b may be iron or some other ferromagnetic material. A magnetic circuit between circular magnet 520 and magnet array 524 is completed along a path including magnetic field lines 522 and 526. Displacement of magnetic array 524 along force vector 529 increases magnetic reluctance forces while displacement of magnet array 524 along force vector 528 increases magnetic forces of attraction between magnet array 524 and circular magnet 520. Means (not shown) are required to maintain the gap between the magnet array and the circular magnet.

Figure 7:
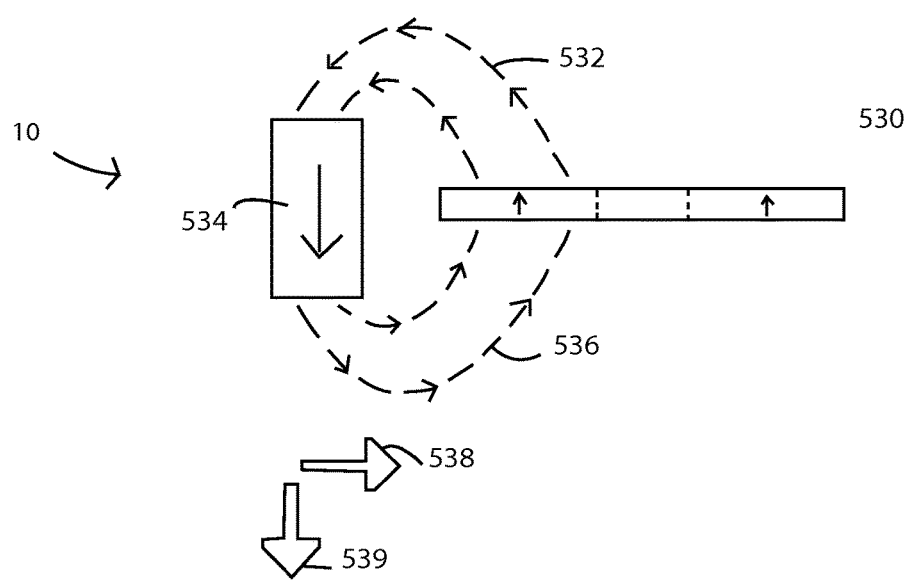
FIG. 7 is a schematic representation of a magnetic circuit showing a magnet array with 1 magnet.

FIG. 7 demonstrates that an array comprising even a single magnet may be configured to complete a magnetic circuit. The north magnetic pole of circular magnet 530 couples along field lines 532 with the south magnetic pole of magnet 534. The north magnetic pole of magnet 534 couples along field lines 536 with the south magnetic pole of circular magnet 530 to complete the magnetic circuit. Displacement of magnet 534 along force vector 539 increases forces of magnetic reluctance whereas displacement of magnet 534 along force vector 538 increases magnetic forces of attraction between magnet array 534 and circular magnet 530. Means (not shown) are required to maintain the gap between the magnet array and the circular magnet.

One version of the device is a magnetic bearing for a rotating shaft, made up of a generally elongate shaft with a linear axis and configured for rotation around the linear axis with the shaft substantially held within a predetermined position on the linear axis by magnetic forces, wherein the predetermined position results in least magnetic reluctance. It includes a number of stationary magnet arrays surrounding said linear axis of the shaft, with each magnet array made up of at least three magnets, configured to form at least a first and a second zone of increased magnetic flux, wherein the first zone comprises a north magnetic pole and the second zone comprises a south magnetic pole. It also includes a circular magnet element attached to the shaft and held in place on the linear axis in the zone of least magnetic flux with the first and second zones of magnetic repulsion on either side of the circular magnet bearing; and a bearing for centering the shaft so as to maintain a predetermined gap distance between the one or more magnet arrays and the circular ferrous element; wherein the shaft is substantially held in a preselected position on the linear axis and in a predetermined point in a plane of rotation by magnetic forces between the magnet arrays and the circular magnet element.

The device described immediately above also includes a means of centering the shaft in the form of a bearing, such as an annular bearing.

The present invention is intended, among other uses, to serve as a small-scale alternative to a fluid thrust plate for use in impeller-driven applications.

While certain exemplary embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

The invention claimed is:

1. A magnetic bearing for a shaft, comprising:
a generally elongate shaft with a linear axis;
at least one axially magnetized permanent circular magnet, operationally connected to said shaft such that said shaft passes through the center of said circular magnet, so that the magnetic axis of said permanent circular magnet is parallel to said shaft;
at least one permanent magnet array attached to a frame and disposed around said circular magnet, said magnet array configured for two or more magnetic poles facing said circular magnet, said magnetic poles comprising a north pole and a south pole, and said magnetic poles extending normal to said magnetic axis of said ring magnet, said permanent magnet array further configured to focus magnetic flux asymmetrically so that said north magnetic pole and said south magnetic pole extend parallel to each other from the same side of said permanent magnet array, so that said permanent magnet array thereby couples magnetically with said permanent circular magnet in a pincher effect; and
at least one centering bearing fixably attached to said frame and slidingly attached to said shaft, thereby restricting radial displacement of said shaft and permitting axial displacement of said shaft;
wherein said at least one permanent magnet array focuses magnetic flux so as to complete magnetic circuits between said magnet array and said circular magnet, with a result that axial displacement of said shaft causes an increase in magnetic reluctance and thereby limits displacement of said shaft.

2. The magnetic bearing of claim 1 wherein said shaft is attached to a flywheel.

3. The magnetic bearing of claim 1 wherein the shaft is attached to a variable load, wherein the degree of axial displacement corresponds to the magnitude of said load.

4. The magnetic bearing of claim 1 wherein the shaft is attached to a vibrating load.

5. The magnetic bearing of claim 1 wherein said at least one permanent magnet array is incorporated within a reluctance array of 3 magnets.

6. The magnetic bearing of claim 1 wherein said at least one permanent magnet array is incorporated within a Halbach series of at least 5 permanent magnets.

7. A magnetic bearing for a shaft, comprising:
a generally elongate shaft with a linear axis and said shaft held within a selected position on said linear axis by magnetic forces;
at least one axially magnetized permanent ring magnet surrounding said shaft and attached to a frame such that said magnetic axis of said permanent ring magnet is parallel to said linear axis of said shaft;
one or more permanent magnet arrays operationally connected to said shaft, said magnet arrays configured for two or more magnetic poles facing said ring magnet, said magnetic poles comprising a north pole and a south pole, said north pole extending parallel to said south pole and normal to said magnetic axis of said ring magnet, said magnet arrays further configured so that each north pole of each said magnet array couples magnetically to the south pole of said permanent ring magnet, and said permanent magnet arrays further configured so that each south pole of each of said magnet array couples magnetically to the north pole of said permanent ring magnet; and
at least one centering bearing fixably attached to said frame and slidingly attached to said shaft, thereby restricting radial displacement of said shaft and permitting axial displacement of said shaft;
wherein said at least one permanent magnet array focuses magnetic flux so as to complete magnetic circuits between said magnet array and said ring magnet, with a result that axial displacement of said shaft causes an increase in magnetic reluctance and thereby limiting displacement of said shaft.

8. The magnetic bearing of claim 7 wherein said shaft is attached to a flywheel.

9. The magnetic bearing of claim 7 wherein the shaft is attached to a vibrating load.

10. The magnetic bearing of claim 7 wherein the shaft is attached to a variable load, wherein the degree of axial displacement corresponds to the magnitude of said load.

11. The magnetic bearing of claim 7 wherein said permanent magnet arrays are each incorporated within a reluctance array of three magnets.

12. The magnetic bearing of claim 7 wherein said permanent magnet arrays are each incorporated within a Halbach series of at least 5 magnets.

13. A magnetic bearing for a rotating shaft, comprising:
a generally elongate shaft with a linear axis and configured for rotation around said linear axis with said shaft held within a selected position by magnetic interactions on said linear axis so as to support a load coaxially with said linear axis;

at least one axially magnetized permanent circular magnet, attached to said shaft and oriented normal to said shaft so that said linear axis of said shaft passes through the center of said permanent circular magnet;

at least one permanent magnet array, magnetically coupled to said circular magnet, said magnet array comprising at least one permanent magnet, said permanent magnet array attached to a frame and configured to focus at least one magnetic pole towards said circular magnet, said magnetic pole facing a direction normal to said shaft;

at least one centering bearing attached slidably to said shaft;

wherein said shaft is held in a selected position by magnetic interactions between said permanent magnet array and said permanent circular magnet.

14. The magnetic bearing of claim 13 wherein the shaft is attached to a flywheel.

15. The magnetic bearing of claim 13 wherein the shaft is attached to a vibrating load.

16. The magnetic bearing of claim 13 wherein the shaft is attached to a variable load, wherein the degree of axial displacement corresponds to the magnitude of said load.

17. The magnetic bearing of claim 13 wherein said one or more permanent magnet arrays are permanent horseshoe magnets.

18. The magnetic bearing of claim 13 wherein said permanent magnet arrays are each incorporated within a reluctance array of three magnets.

19. The magnetic bearing of claim 13 wherein said permanent magnet arrays are each incorporated within a Halbach series of at least 5 magnets.

20. The magnetic bearing of claim 13 wherein the at least one permanent magnet array magnetically couples to the circular magnet in a pincher effect.

* * * * *